Aug. 22, 1939.　　　　J. A. FITCH　　　　2,170,473
APPARATUS FOR AND PROCESS OF MAKING NUTS
Filed Dec. 23, 1937　　　7 Sheets-Sheet 1

Inventor
JASON A. FITCH
By Milans & Milans
Attorneys

Aug. 22, 1939.  J. A. FITCH  2,170,473
APPARATUS FOR AND PROCESS OF MAKING NUTS
Filed Dec. 23, 1937  7 Sheets-Sheet 2

Inventor
JASON A. FITCH
By Milans & Milans
Attorneys

Aug. 22, 1939.    J. A. FITCH    2,170,473
APPARATUS FOR AND PROCESS OF MAKING NUTS
Filed Dec. 23, 1937    7 Sheets-Sheet 3

Inventor
JASON A. FITCH
By Milans & Milans
Attorneys

Aug. 22, 1939.　　　J. A. FITCH　　　2,170,473
APPARATUS FOR AND PROCESS OF MAKING NUTS
Filed Dec. 23, 1937　　　7 Sheets-Sheet 4

Inventor
JASON A. FITCH
By Milans & Milans
Attorneys

Aug. 22, 1939.  J. A. FITCH  2,170,473
APPARATUS FOR AND PROCESS OF MAKING NUTS
Filed Dec. 23, 1937   7 Sheets-Sheet 5

Inventor
JASON A. FITCH
By Milano & Milano
Attorneys

Aug. 22, 1939.  J. A. FITCH  2,170,473
APPARATUS FOR AND PROCESS OF MAKING NUTS
Filed Dec. 23, 1937  7 Sheets-Sheet 6

Inventor
JASON A. FITCH
By Milans & Milans
Attorneys

Aug. 22, 1939. J. A. FITCH 2,170,473
APPARATUS FOR AND PROCESS OF MAKING NUTS
Filed Dec. 23, 1937 7 Sheets-Sheet 7

Inventor
JASON A. FITCH
By Milans & Milans
Attorneys

Patented Aug. 22, 1939

2,170,473

UNITED STATES PATENT OFFICE 2,170,473

APPARATUS FOR AND PROCESS OF MAKING NUTS

Jason A. Fitch, Youngstown, Ohio

Application December 23, 1937, Serial No. 181,400

11 Claims. (Cl. 10—78)

My invention relates to new and useful improvements in an apparatus for and a process of making nuts of the so-called "clincher type" in which there is a projecting flange or protrusion from one face adapted to be positioned in and through an opening formed in an object to which the nut is to be attached, the flange or protrusion being turned over the opposite face of the object to that against which the nut is positioned and thereby clinching and securely holding the nut to the object.

The principal object of the invention resides in the provision of a novel process and apparatus wherein a nut of the character described may be quickly and cheaply made with but a few operations, the blank from which the nut is formed being cut or pressed from a plate or strip of material and reformed to provide the nut having the flange or protrusion from one face thereof.

Another object of the invention consists in the provision of novel means whereby a clincher type of nut may be formed with a "bulge" from that face opposite to the one from which the flange or protrusion extends, this "bulge" providing a threaded opening of greater length than in the ordinary form of nut.

With the above and other objects in view, which will appear as the description proceeds, my invention consists in the novel details of construction, and arrangement of parts, described in the following specification and illustrated in the accompanying drawings, and while I have illustrated and described the preferred embodiments of the apparatus for carrying forward the process or method which will be described and claimed it will be understood that such changes may be made as will fall within the scope of the appended claims.

In Figs. 1 to 15 inclusive I have illustrated the process of and apparatus for forming a clincher type of nut having a flange or protrusion from one face thereof while in Figs. 16 to 27 inclusive of the drawings I have illustrated the method of and apparatus for making a nut of the clincher type having a flange or protrusion from one face and what may be termed a bulge or projection from the opposite face, this bulge or projection providing additional length for the threaded opening and saving the material of the opening or recess formed in the initial steps.

As the specific formation of punch or press forms no particular part of my present invention I have not illustrated, in the drawings, the complete machines or apparatus for carrying forward the process which will be set forth but I have only illustrated a sufficient part of the apparatus or apparatuses for carrying forward the process or processes which will be described and claimed, it being thought that the portions of the apparatus shown will clearly set forth the steps in the process.

Figure 18:
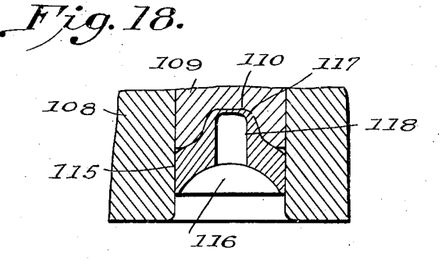
Fig. 18 is a detail showing the punched blank of Fig. 17 positioned in the die.
Figure 19:
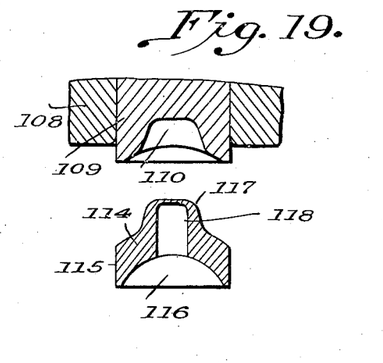
Fig. 19 is a sectional detail showing the formation of the blank of Figs. 17 and 18 removed from the die.
Figure 20:
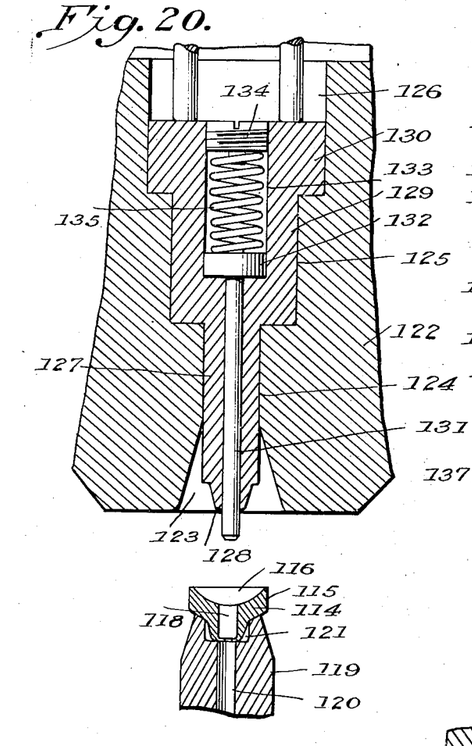
Fig. 20 shows a sectional detail with the blank formation of Figs. 17, 18 and 19 in position for formation into a mass of the form shown in Fig. 21.
Figure 21:
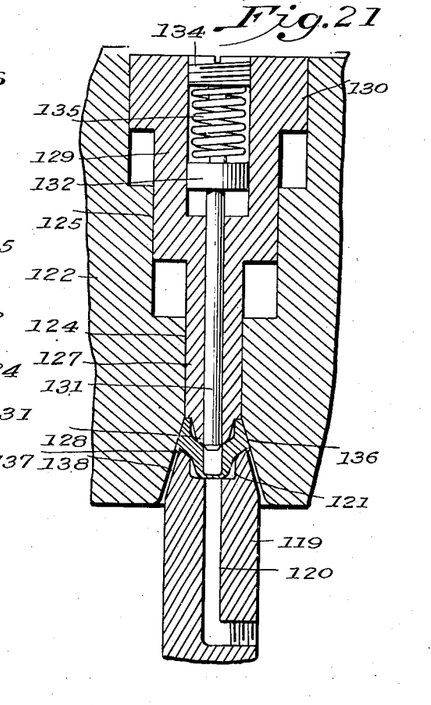
Fig. 21 is a view similar to Fig. 20 with the blank of Fig. 20 formed into a mass with inclined side walls.
Figure 22:
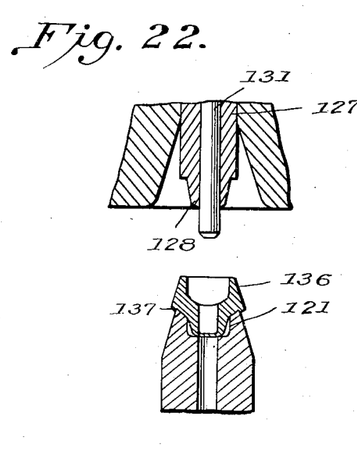
Fig. 22 is a fragmental detail showing the mass, as formed in Fig. 21, positioned upon its support.
Figure 23:
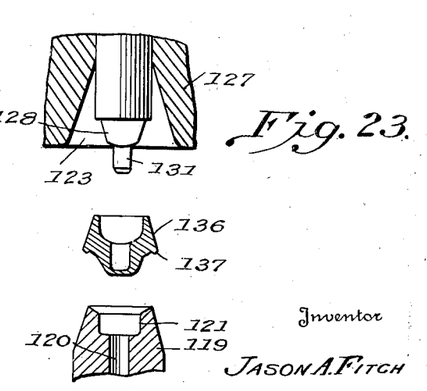
Fig. 23 shows the mass being removed.
Figures 24, 25, 26, 27:
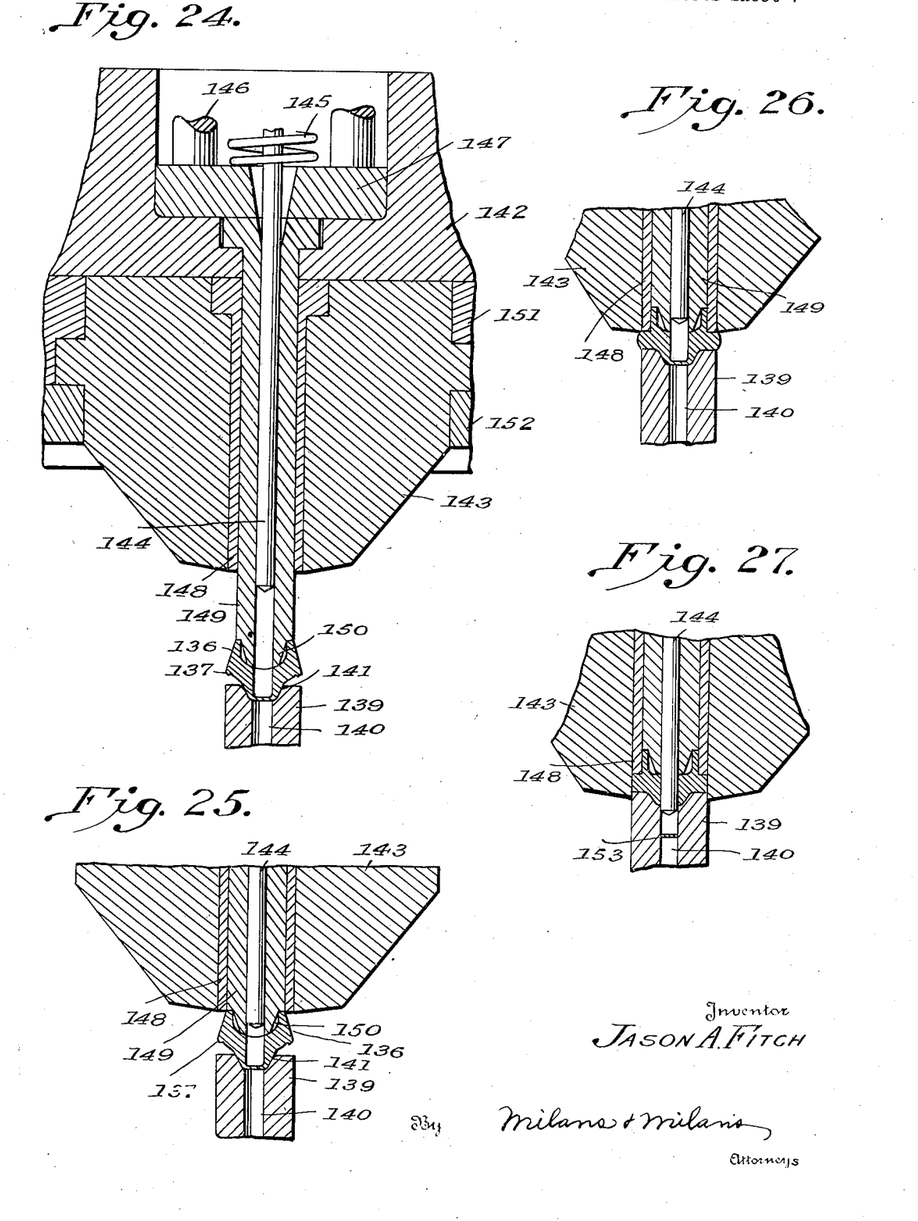
Fig. 24 shows the mass of Figs. 21 to 23 inclusive positioned for a final operation with the centering member in lowered position in engagement with the mass.
Fig. 25 is a fragmental sectional detail showing the parts in position to form the clincher flange on the face of the nut.
Fig. 26 is a fragmental sectional detail showing the clincher flange completed.
Fig. 27 shows the positions of the parts of Figs. 24 to 26 inclusive after completing the nut, the shearing die being in its lowermost position.

In that process of and apparatus for making the clincher nut, illustrated in Figs. 1 to 15 inclusive of the drawings, I have shown and described what might be termed three operations, the first operation being that of punching a blank from a sheet or strip of material and forming the same into cup shape, the second operation being the formation of the blank, provided in the first operation, into what may be termed a mass of frusto-conical shape in which the side of the mass will be of tapered formation, the bottom will be curved, and a recess will be formed in the upper surface, and the third or final operation consists in taking the mass produced in the second operation and forming the same into the configuration of a nut having an opening therein and a protrusion or flange from one face and then shearing the edge of the edge portion of the body to provide a straight edge for the completed nut. In that process and apparatus illustrated in Figs. 16 to 27 inclusive of the drawings I have shown substantially the same operations. There are three operations to form the completed nut illustrated in Fig. 27 of the drawings, it being understood that the showing in this figure is of a completed nut with the exception of threading the central bore. In carrying out this latter process in the first operation a blank is stamped from a sheet or strip of material and formed with a concaved face and the opposite face provided with what may be termed a bulge or projection, a recess being formed centrally of the shaped blank, but not providing a complete opening therethrough. This first operation is carried forward in the manner as more particularly set forth or illustrated in Figs. 16 and 17 of the drawings. In Figs. 20 and 21 I have illustrated the second operation in which the blank of the configuration shown in Fig. 19 is seated upon a support, as shown in Fig. 20 and then formed into the mass of the shape shown in Fig. 21 of the drawings. In Figs. 24 to 27 of the drawings I have shown the third or final operation in which the shaped mass, shown in Figs. 21 and 23, is positioned upon a support as shown in Fig. 24 and is then pressed to provide the formation shown in Fig. 26, a protrusion extending from one face while the flange or projection, for clinching, extends from the opposite face. As a final movement a die operates to shear and straighten the edge of the nut, as shown more particularly in Fig. 27 of the drawings, and in this operation a punch is operated to form a complete opening through the nut. This opening will later be threaded.

In the construction disclosed in Figs. 1 to 15 inclusive of the drawings a base is shown at 1 and yieldably supported on the base, by means of the springs 2, is what might be termed a bed 3 having an opening 4 therein and into which opening projects the punch 5 having a rounded upper end as shown at 6. This punch 5 is carried by the base 1 and guide pins for the bed 3 are shown at 7, these pins being provided with enlarged heads 8 which operate in openings 9 formed in the base 1. A strip or plate 10 of steel, or other material is adapted to be supported upon the bed 3, as shown more particularly in Fig. 1 of the drawings, and a blank for the nut will be struck from this sheet or plate in a manner which will be apparent as the description proceeds. At 11 I have shown a support, carrying a cutting die 12, and this cutting die is provided with a vertical opening 13 terminating in the enlarged recess or opening 14. The lower edge of the opening 13 is beveled as shown at 15 to provide a slight radius and slidably mounted in the opening 13 is what might be termed a knock-out pin 16 having the enlarged head portion 17 operable in the recess or opening 14. This knock-out pin will be operated from a rod 18. The punch 5 is provided at its upper end with a pointed projection 19 and a similar projection 20 is provided on the lower end of the knock-out pin 16. As the first step in my improved process of forming the nut, the strip of material 10 will be positioned as shown more particularly in Fig. 1 of the drawings and the support 11 will be lowered by suitable mechanism, forming no part of the present invention, and will carry with it the die 12 and knock-out pin 16. As the head is lowered the projection 20 of the knock-out pin will initially engage the strip of material and when it does contact therewith the pin will be held and the die 12 will continue its downward movement to cut a blank from the strip of material 10 and during the downward movement of course the bed 3 will be lowered against the action of the springs 2 and the punch 5 will be projected through the material and cooperating with the die 12 cut a blank of the shape shown more particularly at 21 in Fig. 5 of the drawings with a recess 22 in its upper surface and a recess 23 in its lower or concaved face. In this formation the blank 21 is also formed with the vertical edge portion 24. When the blank has been cut the parts will be in the positions shown more particularly in Fig. 2 of the drawings and then the support 11, with its associated die and punch, will be raised into the position shown in Fig. 3 of the drawings with the blank 21 positioned in the opening 13 beneath the pin 16 as shown. As a next operation the pin 16 will be lowered into the position shown in Fig. 4 of the drawings and knock out the blank as shown.

Figure 1:
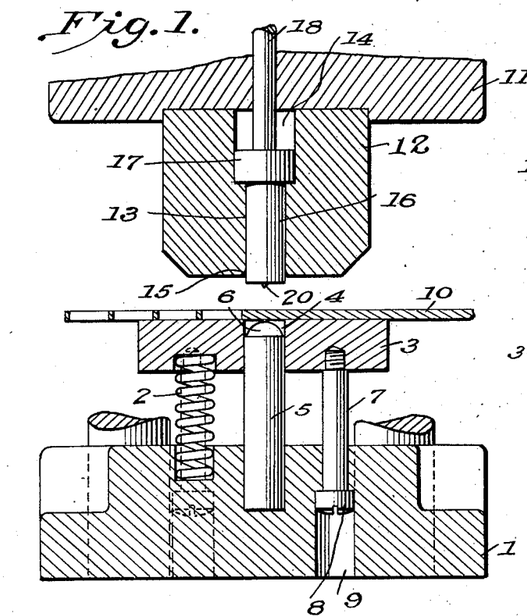
Fig. 1 is a fragmental transverse vertical section, with parts shown in elevation, showing the initial position of the apparatus with a plate or strip supported and from which the blank to form the nut is to be pressed.
Figure 2:
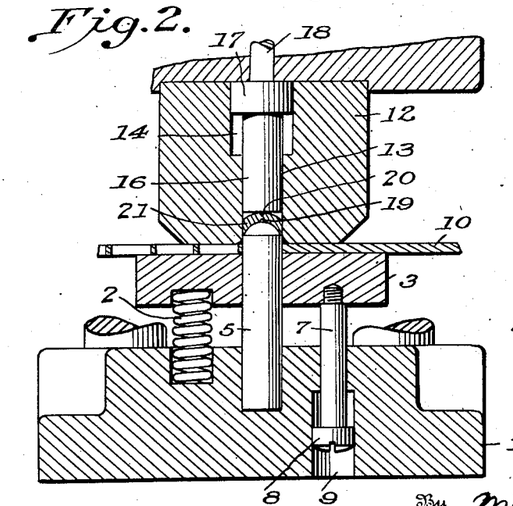
Fig. 2 is a view similar to Fig. 1 showing the parts in position after the blank has been pressed from the plate or strip.
Figure 3:
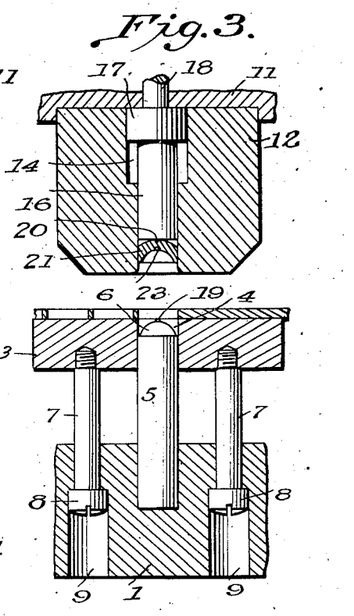
Fig. 3 is a transverse vertical section, with parts shown in elevation, showing the positions of the parts after the blank has been pressed from the strip or plate, the blank being in position in the die before being knocked therefrom.
Figure 4:
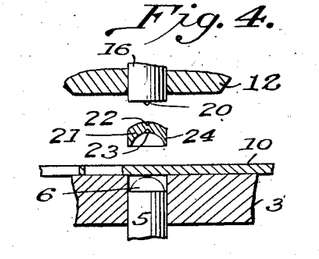
Fig. 4 is a fragmental sectional detail, with parts in elevation, showing the blank being knocked out from the die.
Figure 5:
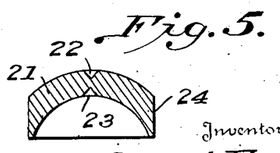
Fig. 5 is a transverse vertical section showing the blank formed in the operations disclosed in Figs. 1 to 4 inclusive.
Figure 6:
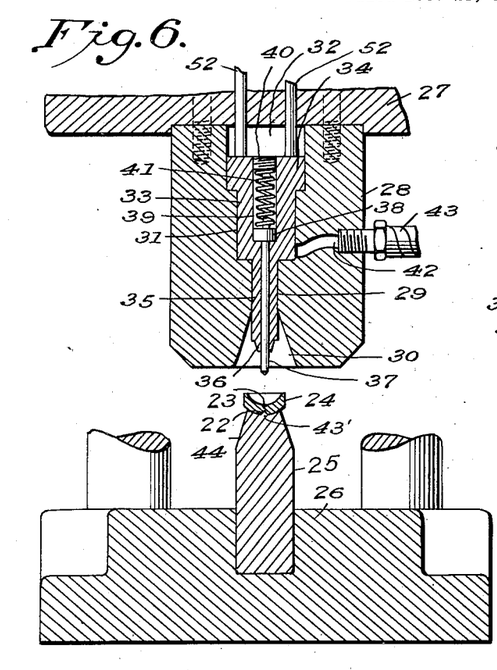
Fig. 6 illustrates a fragmental transverse vertical section, with parts in elevation, showing the blank disclosed in Fig. 5 reversed and supported for what might be termed the second operation in forming the nut.
Figure 7:
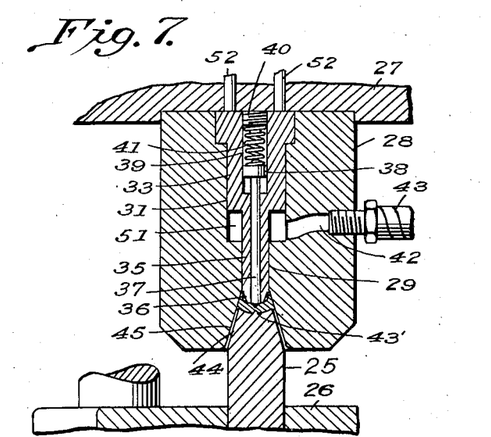
Fig. 7 is a fragmental sectional detail illustrating the die of Fig. 6 in lowered position and forming the blank illustrated in Fig. 6 into a mass formation of frustro-conical shape.
Figure 8:
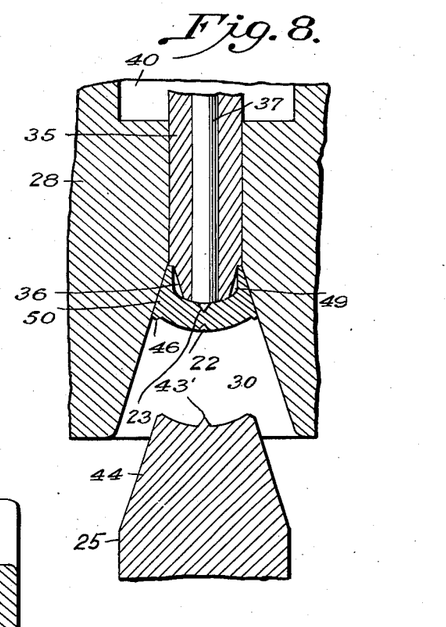
Fig. 8 shows the die of Figs. 6 and 7 in raised position after the operation shown in Fig. 7 and the shaped mass in position to be knocked from the die.

The second step in the operation of forming the complete nut is shown more particularly in Figs. 6 to 9 inclusive of the drawings. The blank 21, shown in Fig. 5, is placed on and supported by a punch 25, carried by the base 26, and in positioning the blank 21 upon this punch the convex surface thereof is supported in a concaved end portion of the punch. At 27 I have shown a reciprocable member, operated in any desired manner forming no part of the present invention, and this support carries the die 28 having the vertically extending opening 29 merging at its lower end with the flared opening 30 and at its upper end communicating with an enlarged recess 31 which in turn communicates with a somewhat larger recess or opening 32. Received and slidable in the recess 31 is the sleeve 33 having at its upper end an enlarged head 34 operable in the recess 32 and at its lower end an extension 35 operable in the opening 29. This extension 35 is formed at its lower end with the reduced portion 36 and also has a center bore in which is received and operates a centering or knockout pin 37 having at its upper end an enlarged head 38 operable in the recess 39 of the sleeve 33. The upper end of the recess 39 is threaded to receive the plug 40 and received in the recess is the spring 41 engaging the plug 40 at its upper end and the enlarged head 38 of the pin 37 at its lower end. At 42 I have shown a passage for introducing lubricant from the pipe 43.

Figure 9:
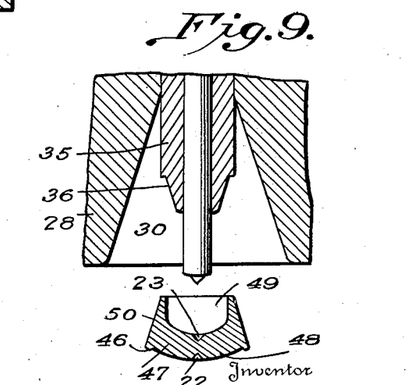
Fig. 9 is a fragmental sectional detail, with parts in elevation, showing the mass formation being knocked or stripped from the die shown in Fig. 8.

In the second operation, as disclosed in Figs. 6 to 9 inclusive of the drawings, the blank 21 is initially positioned on the punch 25, as shown, and then the support 27 is lowered and carries with it the die 28 and associated parts. The end of the pin 37 will initially engage the recess 23 in the concaved face of the blank 21 to properly center the blank, a pointed projection 43' being formed on the upper end of the punch 25 to be received in the recess 22 of the blank. A further lowering of the support 27 will engage the reduced end 36 with the concaved face of the blank and a further downward movement of the support and die 28 will cause the tapered recess portion 30 of the die to engage the blank and due to pressure force the same into a mass of substantially frusto-conical form. It will be noted that the upper end of the punch is tapered as shown at 44 and when received in the tapered portion 30 of the die there will be the space 45 shown more particularly in Fig. 7 of the drawings and this space permits the formation of a flange 46 around the bottom edge of the mass shown generally at 47. The mass will have the rounded bottom 48, a recess 49 in its upper face and a tapered or inclined wall 50 all as shown more particularly in Fig. 9 of the drawings. In forming the mass the recesses 23 and 22 will be preserved. As shown more particularly in Fig. 7 as the die 28 is lowered to its lowermost position the pin 37 will be held and the spring 41 will be placed under tension. The sleeve portion 33 will also be held as shown to provide the space 51. Rods 52 are connected to the enlarged end 34 of the sleeve 33 and act as guides. When the support 27 and die 28 with associated parts are raised into the position shown in Fig. 8 of the drawings the mass 47 will be carried in the tapered recess 30 but will be knocked out by the lowering of the pin 37 by the action of the spring 41. In Fig. 9 of the drawings I have illustrated the mass after having been knocked from the recess.

Figures 10, 11, 12, 13:
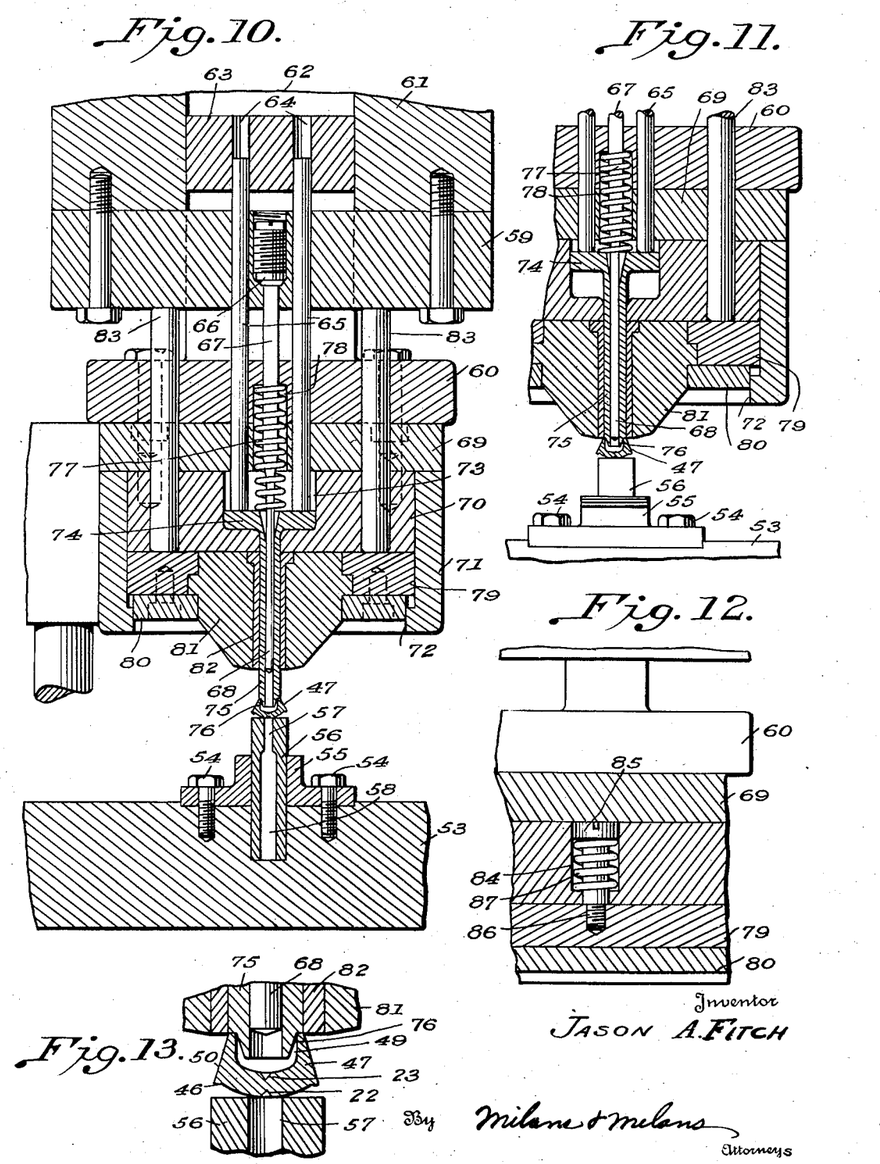
Fig. 10 is a vertical section, with parts shown in elevation, showing the mass formation disclosed in Figs. 8 and 9 positioned for what might be termed the last operation and in this figure the center pin is shown lowered into engagement with the mass.
Fig. 11 is a fragmental sectional detail showing the second step in the last operation in which the flange forming sleeve is shown in engagement with the mass.
Fig. 12 is a sectional detail showing a spring member for returning the shearing die, to be described, to its original normal position.
Fig. 13 is a sectional detail with the parts in the position shown in Fig. 11 of the drawings.
Figures 14, 15:
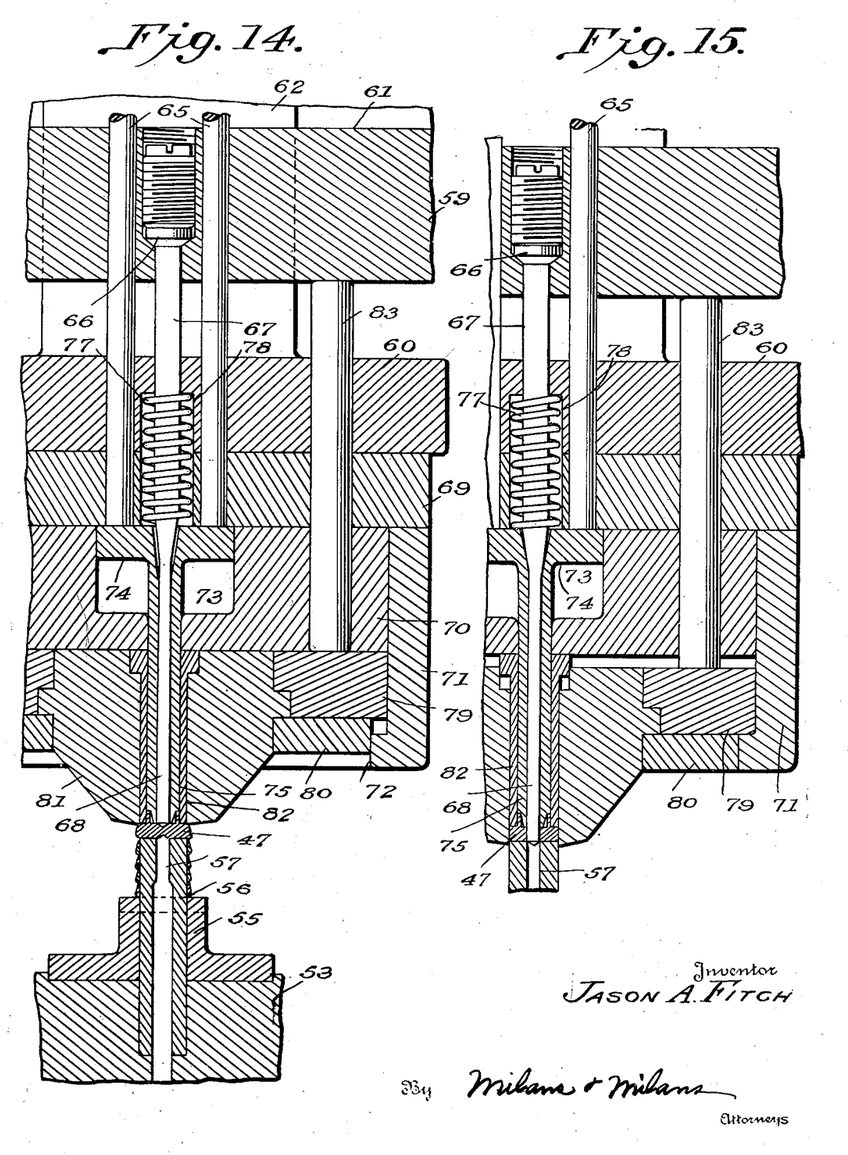
Fig. 14 is a sectional detail showing the parts in position with the clinching flange formed on the face of the nut.
Fig. 15 is a view similar to Fig. 14 showing the edge shearing die in its lowered position with the nut completed.

In Figs. 10 to 15 of the drawings I have illustrated what might be termed the last or finishing operation. Referring more particularly to Fig. 10 of the drawings a base is illustrated at 53 and secured to this base by means of the screws 54 or other suitable fastenings is a collar 55 through which is positioned a sleeve 56 having a reduced opening 57 at its upper end and an enlarged opening 58 at its lower end. The frusto-conical mass 47 is adapted to be positioned on the top of the sleeve 56 as shown more particularly in Fig. 10 of the drawings. At 59 and 60 I have shown cross heads, a cam slide 61 being connected to the cross head 59 while a cam slide 62 is connected to the cross head 60. Operable with the cam slide 61 and cross head 59 is a block 63 having openings 64 therein for the upper ends of the pins 65 and the purpose of these pins 65 will be later brought out. Also secured to the cross head 59, through means of the screw plug 66, is a rod 67 having its lower end reduced to provide the pin 68. Secured to the cross head 60 is the plate 69 and block 70, a sleeve 71 surrounding the block 70, as shown, and provided with an inwardly directed flange 72. The block 70 is provided in its upper surface with a recess 73 in which is received the enlarged head 74 of a downwardly directed sleeve 75, the lower end of which is reduced as shown at 76. The lower ends of the rods 65 engage the upper surface of the enlarged head 74, as shown, and surrounding the rod 67 is a coiled spring 77, the upper end of which is received in the recess 78, while the lower end bears against the enlarged head 74 of the sleeve 75. A ring 79 is positioned in the sleeve 71 and secured to this ring, by means of the band 80, is a shearing or cutting die 81 which has a central bore to receive the sleeve 82. It will be noted that the band 80 is of such a diameter as to be received within the diameter of the bore formed by the inner face of the flange 72 of the sleeve 71. Extending through aligned openings in the cross head plate 69 and block 70 are vertically extending pins 83 the upper ends of which are adapted to be engaged by the under surface of the cross head 59 while their lower ends are adapted to engage the upper surface of the ring 79.

As has been previously stated initially the mass 47 will be supported on the upper end of the sleeve 56 and as the cross head 60 is lowered through operation of the cam slide 62 the lower end of the sleeve 75 will be engaged in the recess 49 of the mass thereby centering the mass and holding the same, as shown more particularly in Fig. 10 of the drawings. A further downward movement of the cross head 60 brings the parts into the position shown more particularly in Fig. 14 of the drawings and the mass is reshaped to provide the nut body having a flange projecting from one face, as shown. In this movement it will be noted that it is the lower end of the sleeve 82 which presses and reshapes the mass and the lower end of the pin 68 is brought into engagement with the recess 23. This pin 68 is lowered through operation of the cross head 59, operated through means of the cam slide 61. When the nut has thus been formed it is only necessary to straighten or shear the edges of the body of the nut and this is accomplished by a further downward movement of the die or cutter 81. The die 81 is operated through engagement of the cross head 59 with the pins 83 and as the cross head lowers it forces these pins downwardly and forces the parts into the position shown more particularly in Fig. 15 of the drawings. This further downward movement of the cross head 59 further lowers the pin 68 and causes the same to punch a hole through the body of the nut and this hole or opening will be later described. The block 70 is formed with a recess 84 in which operates the head 85 of the screw 86 connected to the ring 79 which carries the die or cutter 81. Surrounding the shank of the screw, within the recess 84, is a coiled spring 87 which acts, in the return upward movement of the parts, to draw the die or cutter 81 from the nut and to free the same. It will be appreciated that some such means must be provided due to the frictional engagement of the cutter or die with the edge of the nut.

Figure 16:
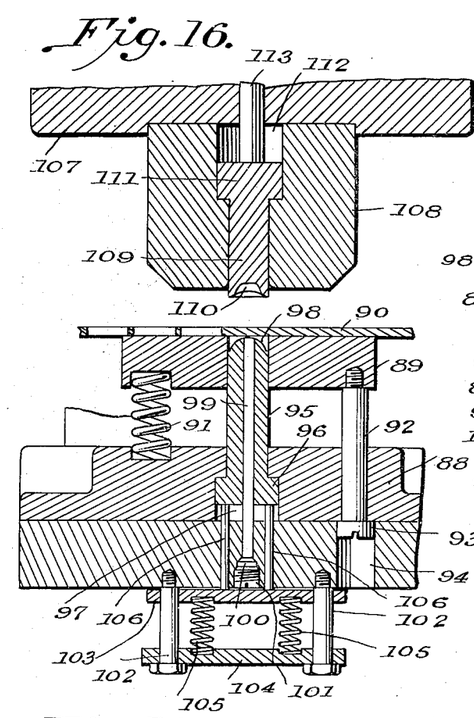
Fig. 16 is a sectional detail, with parts shown in elevation, showing the first step in the formation of a nut of a somewhat modified construction having a bulge on the opposite face of the nut from which the flange protrudes.
Figure 17:
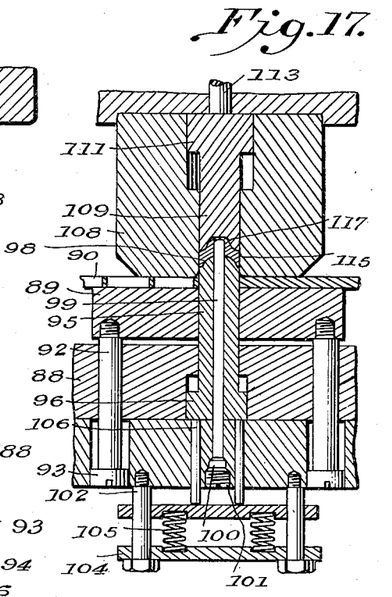
Fig. 17 is a sectional detail showing the parts of Fig. 16 in position after having stamped a blank from the sheet or strip of material.

As has been previously stated, in Figs. 16 to 27 inclusive of the drawings, I have disclosed the process of and apparatus for making a nut similar to that disclosed in Figs. 1 to 15 inclusive of the drawings with the exception that on that face opposite to the one having the clincher flange I have provided a bulge or projection which increases the length of the threaded opening through the nut. In Figs. 16 to 19 inclusive I have shown the process of and apparatus for carrying forward the first operation in making this modified form of nut. In Fig. 16 of the drawings I have shown a base 88 which supports the bed 89 which carries the strip or sheet of material shown at 90. Interposed between the base 88 and bed 89 are coiled springs 91 which normally support the bed 89 in its raised position. Depending screws 92 are secured to the under surface of the bed 89 and extend through openings in the base with their heads 93 operating in the recesses 94 in the base. Projecting upwardly from the base is a punch 95 which is slidably mounted and has its lower end enlarged to provide the head 96 operable in the recess 97. The upper end of the punch is rounded as shown at 98 and the entire punch has an opening therethrough to receive the pin 99 having its enlarged head 100 secured in a recess of the base by means of the screw plug 101. The punch 95 will slide on the pin 99. Secured to the under side of the base 88, by means of the depending screws 102, are the plates 103 and 104 which are normally held in spaced position by the coiled springs 105. Interposed between the upper surface of the plate 103 and the under surface of the head 96 of the punch 95 are the slidable pins 106. Carried by a support 107 is a die 108 in which is slidably mounted a plunger 109 having its lower end concaved as shown at 110 and its upper end enlarged as shown at 111, this enlarged head 111 operating in a recess 112 formed in the die. A rod 113 is secured to the plunger, as shown, and will act to operate the plunger in a manner which will be later described. While either the support 107 or the base 88 and associated parts may be adapted for reciprocable movement I have illustrated, in Fig. 17 of the drawings, that the base and associated parts may be operated or moved relative to the die 108. However, as I have previously stated, the operating mechanism forms no part of the present invention. With the sheet or strip of material 90 supported on the bed 89, as shown, the base 88 and associated parts may be raised into the position shown in Fig. 17 of the drawings. It will be noted that the strip of material will initially engage the lower end of the plunger 109 and force the same upwardly into the die 108. The strip 90 will engage the lower surface of the die 108 and thereby retard the movement of the bed 89. Further movement of the base 88 will cause the punch 95 to press a blank from the strip or sheet of material and said blank will be forced upwardly into the recess of the die causing the plunger 109 to be raised into the position shown in Fig. 17. At the same time the pin 99 will rise relative to the punch 95 and punch a recess into the underside of the shaped blank. When the bed 89 and associated parts are moved to their lowered position the shaped blank will remain in the recess of the die, as shown more particularly in Fig. 18 of the drawings, and then through means of the rod 113 the plunger 109 will be lowered to eject the shaped blank, as shown more particularly in Fig. 19 of the drawings. The shaped blank is indicated generally at 114 having the vertical side wall 115, concaved recessed bottom surface 116 and the bulge or projection 117. The recess extending from the concaved face 116, formed by the pin 99, is shown at 118 and as shown this recess will not extend entirely through the blank.

In Figs. 20 to 23 inclusive I have shown the process of and apparatus for carrying forward the second operation in the formation of the modified form of nut. In carrying forward the second operation the shaped blank shown in Fig. 18 is reversed and supported on the member 119 having the opening 120 therethrough as shown more particularly in Fig. 21 of the drawings. The upper end of the member 119 is formed with the recess 121 to receive the bulge 117 of the blank. At 122 I have shown a die having the flared recess 123 which communicates with the opening 124 leading to the enlarged recess 125 which in turn communicates with the further enlarged recess 126. Slidably mounted in the opening 124 is the punch 127 having its lower end reduced as shown at 128 while its upper end is enlarged as shown at 129 and 130 to be received respectively in the recesses 125 and 126. The punch 127 is formed with a longitudinally extending opening in which is slidably mounted a pin 131 having the enlarged head 132 operable in the recess 133. A screw plug 134 is received in the upper end of the recess 133 and a coiled spring 135 is interposed between the plug 134 and head 132 to normally hold the pin 131 in its lowermost position. I have illustrated the member 119 as being movable relative to the die 122 and with the blank 114 in position the member 119 will be raised into the position shown in Fig. 21 of the drawings and the blank will be forced into the tapered recess 123 and reshaped as shown. It will be noted that the end of the pin 131 engages in the recess 118 of the blank and as the blank is reshaped the vertical wall 115 of the initially shaped blank is reshaped to provide the tapered wall 136 with a circular flange 137 as shown more particularly in Fig. 23. The flange 137 is formed by pressing a certain amount of the metal into the space 138 formed between the upper end of the member 119 and the wall of the tapered portion or tapered recess 123. With the blank itself reshaped the member 119 will be lowered into the position shown in Fig. 22 and then the reshaped blank is removed through means of an air blast through the opening 120.

In Figs. 24 to 27 inclusive of the drawings I have illustrated the third operation in carrying forward the process and in which the apparatus used is of a construction similar to that shown in Figs. 10 to 15 inclusive of the drawings. The blank shown in Fig. 23 is adapted to be supported on the member 139 having the central opening 140 and a recess 141 at its upper end, the bulge or projection of the blank being seated in the recess 141 as quite clearly illustrated. As stated the construction shown in Figs. 24 to 27 inclusive is the same as that shown in Figs. 10 to 15 inclusive and the operation in reshaping or forming the blank will be the same. In Figs. 24 to 27 inclusive the part 142 corresponds to the block 70 of Fig. 10, the die or cutter 143 corresponds to the die or cutter 81, the punch or pin 144 corresponds to the punch or pin 68, the spring 145 corresponds to the spring 77, the rods 146 correspond to the rods 65, the head 147 corresponds and serves the same purpose as the head 74, the sleeve 148 corresponds to the sleeve 82, the member 149 corresponds with the member 75 and has the reduced extension 150 corresponding to the reduced extension 76, the ring 151 corresponds to the ring 79 and the band 152 corresponds with the band 80. As in the operation set forth in connection with Figs. 10 to 15 inclusive of the drawings the lower end of the member 149 will be received in the recess of the shaped blank and then the parts will be lowered so that the sleeve 148 engages the side beveled wall 136 and reshapes the blank into the shape shown in Fig. 26 with a flange projecting from the upper face of the blank. Then the die or cutter 143 will be further lowered with the punch or pin 144 so that the die or cutter will shear and straighten the outer edge of the blank and the punch or pin will force the disc 153 from the end of the recess 118 to complete the opening through the nut as shown more particularly in Fig. 27 of the drawings. Fig. 27 of the drawings shows the complete formation of the nut with a clincher flange extending from one face and a bulge or projection extending from the opposite face.

In carrying out the second and third operations for forming each of the two forms of nut it will be noted that the blanks or masses are supported on a stationary abutment or support and that when pressure is applied to the blank or mass the desired shape is obtained and in the third operation a flat face or surface is provided on the nut.

Having fully described my invention what I claim as new and desire to secure by Letters Patent is:

1. The process of forming a nut with a projection from one face which comprises initially forming a blank into cupped-shape without forming an opening therethrough, next reshaping the cupped-shaped blank into an imperforated mass having a bottom, tapered side wall and recessed upper surface, and finally reshaping the mass into nut formation with the projection from one face thereof, the hole being formed in the nut in this final reshaping.

2. The process of forming a nut with a projection from one face which comprises initially removing a blank from a strip of material and forming the same into cupped-shape without forming an opening therethrough, next reshaping the cupped-shaped blank into an imperforated mass having a bottom, tapered side wall and recessed upper surface, and finally reshaping the mass into nut formation with the projection from one face thereof, the hole being formed in the nut in this final reshaping.

3. The process of forming a nut with a projection from one face which comprises initially forming a blank into cupped-shape without forming an opening therethrough, next reshaping the cupped-shaped blank into an imperforated mass having a bottom with an outwardly directed circumferentially extending flange, tapered side wall and recessed upper surface, and finally reshaping the mass into nut formation with the projection from one face thereof, the hole being formed in the nut in this final reshaping.

4. The process of forming a nut with a projection from one face which comprises initially forming a blank into cupped-shape without forming an opening therethrough, next reshaping the cupped-shaped blank into an imperforated mass having a bottom, tapered side wall and recessed upper surface, and finally reshaping the mass into nut formation with the projection from one face thereof, the edge of the nut being sheared and the hole being formed therein in the final reshaping.

5. The process of forming a nut with a projection from one face which comprises initially removing a blank from a strip of material and forming the same into cupped-shape without forming an opening therethrough, next reshaping the cupped-shaped blank into an imperforated mass having a bottom, tapered side wall and recessed upper surface, and finally reshaping the mass into nut formation with the projection from one face thereof, the edge of the nut being sheared and the hole being formed therein in the final reshaping.

6. The process of forming a nut with a projection from one face which comprises initially forming a blank into cupped-shape without forming an opening therethrough, next reshaping the cupped-shaped blank into an imperforated mass having a rounded bottom, tapered side wall and recessed upper surface, and finally reshaping the mass into nut formation with the projection from one face thereof, the hole being formed in the nut in the final reshaping.

7. The process of forming a nut with a projection from one face which comprises initially forming a blank into a shape having a concaved face and a bulge from the opposite face, next reshaping the blank into an imperforated mass having a bottom, tapered side wall and recessed upper surface, and finally reshaping the mass into nut formation with a projection from one face and a bulge from the opposite face.

8. The process of forming a nut with a projection from one face which comprises initially removing a blank from a strip of material and forming the same into a shape having a concaved face and a bulge from the opposite face, next reshaping the blank into an imperforated mass having a bottom, tapered side wall and recessed upper surface, and finally reshaping the mass into nut formation with the projection from the one face thereof and a bulge from the opposite face.

9. In apparatus for making nuts, cooperating die members for cutting a blank and forming the same into cupped-shape, means for supporting the cupped-shaped blank and means cooperating therewith for reshaping the blank into an imperforated mass having a bottom, tapered side wall and recessed upper surface, a second support for the shaped mass, and means cooperating with the second support for reshaping the mass into nut formation with a projection from one face thereof, said last mentioned means including a slidable member for initially engaging and centering the mass, a second slidable member for pressing the mass, and a third slidable member for shearing the side wall.

10. In apparatus for making nuts, cooperating die members for cutting a blank and forming the same into cupped-shape, means for supporting the cupped-shaped blank and means cooperating therewith for reshaping the blank into an imperforated mass having a bottom, tapered side wall and recessed upper surface, a second support for the shaped mass, and means cooperating with the second support for reshaping the mass into nut formation with a projection from one face thereof, said last mentioned means including a member for initially engaging and centering the mass, a second member for pressing the mass, and a third member for shearing the side wall.

11. In apparatus for making nuts, cooperating die members for cutting a blank and forming the same with a concaved recess in one face and a bulge from the opposite face, means for supporting the shaped blank and means cooperating therewith for reshaping the same into an imperforated mass having a bottom, tapered sides and recessed upper surface, a second support for the shaped mass, and means cooperating with the second support for reshaping the mass into nut formation with a projection from one face thereof and a bulge from the opposite face.

JASON A. FITCH.